United States Patent [19]

Sweeney

[11] Patent Number: 6,036,237

[45] Date of Patent: Mar. 14, 2000

[54] COUPLING FOR CORRUGATED TUBING

[75] Inventor: Michael A. Sweeney, Kent, Ohio

[73] Assignee: Parker-Hannifin Corporation, Cleveland, Ohio

[21] Appl. No.: 08/842,349

[22] Filed: Apr. 24, 1997

Related U.S. Application Data

[60] Provisional application No. 60/017,227, May 9, 1996.

[51] Int. Cl.[7] ........................ F16L 33/00
[52] U.S. Cl. .................. 285/322; 285/323; 285/903; 285/382.7
[58] Field of Search ............................ 285/382.7, 334.5, 285/903, 322, 323, 251, 243

[56] References Cited

U.S. PATENT DOCUMENTS

| | | |
|---|---|---|
| 96,914 | 11/1869 | Hill . |
| 163,588 | 5/1875 | Goodall . |
| 178,313 | 6/1876 | Leland . |
| 262,581 | 8/1882 | Doolittle . |
| 546,314 | 9/1895 | Farrey . |
| 2,112,238 | 3/1938 | Guarnaschelli . |
| 2,113,211 | 4/1938 | Lake . |
| 2,226,039 | 12/1940 | Wiltse . |
| 2,323,912 | 7/1943 | Johnson . |
| 2,357,669 | 9/1944 | Lake . |
| 2,363,586 | 11/1944 | Guarnaschelli . |
| 2,424,727 | 7/1947 | Wenk . |
| 2,430,657 | 11/1947 | Zolleis . |
| 2,496,149 | 1/1950 | Cahenzli, Jr. . |
| 2,497,273 | 2/1950 | Richardson ..................... 285/382.7 |
| 2,549,741 | 4/1951 | Young . |
| 2,848,254 | 8/1958 | Millar . |
| 2,858,147 | 10/1958 | Guarnaschelli . |
| 2,946,607 | 7/1960 | Bauer . |

(List continued on next page.)

FOREIGN PATENT DOCUMENTS

| | | |
|---|---|---|
| 0 331 116 | 9/1989 | European Pat. Off. . |
| 545410 | 6/1993 | European Pat. Off. ............... 285/903 |
| 2 589 979 | 5/1987 | France . |
| 2627397 | 12/1977 | Germany ............................... 285/323 |
| 3508198 | 9/1986 | Germany ............................... 285/322 |
| 40-4125389 | 4/1992 | Japan ..................................... 285/903 |
| 40-6011084 | 1/1994 | Japan ..................................... 285/903 |
| 1742571 | 6/1992 | U.S.S.R. ................................ 285/903 |
| 1371609 | 10/1974 | United Kingdom . |
| WO 99/06750 | 1/1999 | WIPO . |

OTHER PUBLICATIONS

Copy of International Search Report of PCT/US97/06707.
Design and Installation Guide dated Apr. 1996 of Gastite.
Literature on TracPipe, entitled, "TracPipe Runs Circles Aroud Black Iron Pipe" of Mestek, Inc.

*Primary Examiner*—Eric K. Nicholson
*Attorney, Agent, or Firm*—John A. Molnar, Jr.

[57] ABSTRACT

A coupling for connecting a distal end of a corrugated tube with a fitting having a forward coupling end. The coupling includes a collet receivable coaxially over the distal end of the tube and including a circumferential wall portion which extends axially from a forward first end to a rearward second end. The second end is configured as having an outer portion and an inner portion of a diameter smaller than the outer periphery of the tube. The inner portion is configured to be receivable within the root portions of the tube for retaining the collet thereon, and presents a generally rearwardly-facing compression surface. The wall portion is longitudinally dissected through the second end thereof into at least a pair of arcuate, cantilevered segments. Each segment is resiliently yieldable for radial outward movement allowing the tube crest portions to be received through the second end of the wall portion as the collet is advanced forwardly over the distal end of the tube into retention within one of the root portions. A fastening member is journaled over the collet first end and is engagable with the coupling end of the fitting to draw the collet and the distal end of the tube toward the fitting. The fastening member has an inner radial surface extending to a rearwardly-facing shoulder portion configured to abuttingly engage the outer portion of the collet second end for urging the collet rearwardly toward the fitting.

38 Claims, 5 Drawing Sheets

U.S. PATENT DOCUMENTS

| | | |
|---|---|---|
| 2,991,093 | 7/1961 | Guarnaschelli . |
| 3,008,736 | 11/1961 | Samiran . |
| 3,112,937 | 12/1963 | Williams . |
| 3,214,200 | 10/1965 | Carlson et al. .................... 285/382.7 |
| 3,294,426 | 12/1966 | Lyon . |
| 3,306,637 | 2/1967 | Press et al. . |
| 3,381,980 | 5/1968 | Smith . |
| 3,429,596 | 2/1969 | Marshall . |
| 3,454,290 | 7/1969 | Tairraz ................................ 285/323 |
| 4,046,451 | 9/1977 | Juds et al. . |
| 4,073,512 | 2/1978 | Vian et al. . |
| 4,136,897 | 1/1979 | Haluch ............................... 285/382.7 |
| 4,302,036 | 11/1981 | Burge . |
| 4,423,891 | 1/1984 | Menges . |
| 4,630,850 | 12/1986 | Saka . |
| 4,669,761 | 6/1987 | Huling . |
| 4,674,775 | 6/1987 | Tajima et al. . |
| 4,801,158 | 1/1989 | Gomi . |
| 4,867,489 | 9/1989 | Patel . |
| 4,904,002 | 2/1990 | Sasa et al. . |
| 4,907,830 | 3/1990 | Sasa et al. . |
| 4,909,547 | 3/1990 | Guy . |
| 5,080,405 | 1/1992 | Sasa et al. . |
| 5,131,145 | 7/1992 | Badoureauz . |
| 5,226,682 | 7/1993 | Marrison et al. . |
| 5,261,707 | 11/1993 | Kotake et al. ......................... 285/903 |
| 5,292,156 | 3/1994 | Sasa et al. . |
| 5,356,181 | 10/1994 | Shirogane et al. ..................... 285/903 |
| 5,413,147 | 5/1995 | Moreiras et al. . |
| 5,423,578 | 6/1995 | Kanomata et al. . |
| 5,441,312 | 8/1995 | Fujiyoshi et al. . |
| 5,489,127 | 2/1996 | Anglin et al. . |
| 5,543,582 | 8/1996 | Stark et al. ........................ 285/382.7 |
| 5,580,105 | 12/1996 | Miller, Jr. et al. .................... 285/322 |
| 5,799,989 | 9/1998 | Albino . |

COUPLING FOR CORRUGATED TUBING

This application claims benefit of provisional application Ser. No. 60/017,227 filed May 9, 1996.

BACKGROUND OF THE INVENTION

The present invention relates generally to a coupling for connecting corrugated tubing with a fitting, and more particularly to a coupling which includes a one-piece collet member which facilitates the assembly of the coupling.

Corrugated tubing, often fabricated of stainless steel, copper, or the like and jacketed with a plastic material, is commonly employed in residential or commercial building constructions as a transitional fluid conduit extending between an appliance or other machine and a rigid auxiliary line, pipe, or other connection of a fuel source which typically is natural gas, propane, or the like. The flexibility of such tubing facilitates the alignment of couplings and other connections, and also accommodates limited movement of the appliance or machine with respect to the rigid connection of the fuel source.

More recently, tubing of such type has been proposed as a substitute for traditional hard, i.e., inflexible, steel or iron "black" pipe in gas line applications for residential and commercial construction. Again, the flexibility of the tubing facilitates its installation through walls, ceilings, and floors and, especially, the alignment of the tubing connections. Such tubing, moreover, is lightweight, easy to carry, requires no threading or heavy equipment therefor, allows the use of fewer fitting connections, and exhibits less leak potential than conventional, hard piping. Corrugated tubing of the type herein involved additionally is used in other fluid transport applications such as in air conditioning, hydraulics, and general plumbing, and also as conduit for electrical applications. Tubing manufacturers include the Parflex Division of Parker-Hannifin Corp., Ravenna, Ohio, Titeflex Corp., Springfield, Mass., OmegaFlex, Inc., Exton, Pa., and Wardflex Manufacturing, Blossburg, Pa.

It is common practice to terminate either or both of the distal ends of a length of corrugated tubing with a coupling for providing a leak-free connection or other transition, and/or for effecting a mechanical locking of the tubing ends limiting their movement under pressure or force. For example, U.S. Pat. Nos. 5,441,312; 4,630,850; 4,674,775; and 2,323,912 disclose couplings of such type which generally comprise a sleeve and a cap nut. The sleeve and nut are coaxially received over a distal end of the tube for connection to a fitting associated with the auxiliary line or the appliance.

Sweeney, in commonly-assigned, co-pending provisional application U.S. Ser. No. 60/035,901 entitled "Split-Ring Coupling for Corrugated Tubing and Method of Assembly," filed Jan. 23, 1997, discloses a coupling for connecting a distal end of a corrugated tube with a fitting having a forward coupling end with a tapered surface. The coupling includes an annular compression member having an opening therethrough which extends from a forward end portion receivable coaxially over the tube to a rearward end portion threadably engagable with the fitting to urge the tube into a fluid-tight engagement therewith. The forward end portion of the opening has a rearward first end, a forward second end defining the inner diametric extent of the opening, and an inner radial surface extending therebetween from a rearward gland portion to a forward camming portion. An annular locking member is journaled within the gland to be received therewith over the tube. The locking member is expandable within the gland by the crest portions of the tube as the locking and compression members are received thereover, and is compressible within a root portion of the tube responsive to the bearing of the compression member camming surface thereon as the compression member is threadably engaged with the fitting. When compressed, the locking member delimits the forward advancement of the tube out of the opening of the compression member.

Young, U.S. Pat. No. 2,549,741, discloses a pipe joint which includes a coupling nut adapted for a threaded connection with a spigot member. The coupling nut has an internal groove for receiving a split ring, and the spigot member has a conical surface for receiving the flared surface of a pipe. Upon the tightening of the nut on the spigot member, the split ring is made to compresses the flared pipe surface against the spigot.

Sasa et al., U.S. Pat. No. 4,904,002, discloses a fluid coupling for a corrugated pipe which includes a body having a fluid passage, and an outer sleeve having a collar which retains a pair of C-rings. The outer sleeve is adapted to reduce the diameter of the C-rings such that the rings are forced into the root portions of the corrugated pipe wherein the rings are held axially in position.

Sasa et al., U.S. Pat. No. 5,080,405, discloses another coupling for corrugated pipe which includes an inner cylindrical section having an annular groove for receiving a split ring. The groove extends from a forward flange portion to a rearward tapered surface which is formed on the groove. Upon the insertion of an end of the pipe into the cylindrical section, the ring is urged into a corrugation of the corrugated pipe by the tapered surface of the groove.

Sasa et al., U.S. Pat. No. 5,292,156, discloses another fluid coupling for a corrugated pipe. The coupling includes a locking cylinder having a groove which accommodates the radial expansion of a ring received therein when the end of a corrugated pipe is inserted into the cylinder.

Hughes, U.K. Patent No. 1,371,609, discloses another joint for a corrugated pipe which includes a fitting to which a nut is threadably connected. The nut is formed as having a groove portion for retaining a split compression ring. Upon the insertion of an end of the pipe into the nut, the split ring is urged into a into a corrugation of the pipe. The nut then may be tightened on the fitting for drawing the pipe inward into a fluid-tight connection.

Marrison et al., U.S. Pat. No. 5,226,682 discloses a coupling including a first and second member and an annular locking ring interposable therebetween. For receiving the locking ring, the first member is provided as having an exterior surface with a groove, and the second member is provided as having an inner surface with a cavity. The first and second members are secured together when the locking ring is engaged in the groove ands the cavity.

Another representative coupling for corrugated tubing is marketed commercially by OmegaFlex, Inc., Exton, Pa., under the tradename "AutoFlare™." As is described in the OmegaFlex Publication "TracPipe Flexible Gas Piping," Catalog TP197, such coupling involves a two-piece metal split ring which is received within a root of the tubing corrugation for retaining a fastening nut. An associated fitting is provided for a threaded connection with the nut as having a hardened sleeve. The sleeve effects a flaring of the first tubing corrugation to provided a seal with a corresponding tapered surface of the fitting as the tubing end is drawing toward the fitting by the nut.

Yet another representative coupling for corrugated tubing is marketed commercially by Titeflex Corp., Springfield, Mass. As is described in the Titeflex publication "Gastite™ Design and Installation Guide," April 1996, such coupling employs a two-piece metal split ring for positioning a swivel nut. The nut is slidably mounted over the end of the tubing, and the split rings are positioned in the valley, i.e., root or trough, of the first convolution of the corrugations. The nut then is advanced toward the end of the tubing to capture the split rings. A socket flaring tool next is threaded into the nut and tightened. The tightening of the flaring tool compresses the first convolution of the tubing to form a flared seat. The nut lastly is threadably engaged with a corresponding end of the fitting.

However, the provision of two-piece split rings has been observed to complicate the assembly of the coupling. For example, as being of a relatively small size and separate from the nut, the rings are often lost or simply forgotten during installation. One or both of the rings additionally may fall out of the tubing prior to the connection of the nut to the fitting. If either of the rings is accidentally omitted, the tubing cannot be sealed to the fitting and a hazardous leak may result.

As the use of corrugated tubing in gas line and other fluid transfer applications continues to increase, it will be appreciated that further improvements in the design of couplings therefor would be well-received by both industry and consumers alike. A preferred design would be economical to manufacture, but would also simplify the assembly of the coupling while providing a connection which minimizes the potential for leaks and the like.

In view of the foregoing, it will be appreciated that improvements in the design of couplings for corrugated tubing would be well-received by both industry and consumers alike. A preferred design would simplify the assembly of the coupling while providing a connection which minimizes the potential for leaks and the like.

SUMMARY OF THE INVENTION

The present invention is directed to a coupling for corrugated tubing, and more particularly to a coupling for connecting a distal end of such tubing with a fitting. The coupling utilizes a one-piece, slotted collet which is received over a distal end of the tubing for positive retention within a root of a convolution thereof. The collet both facilitates the positioning of an associated fastening member such as a cap nut which may be attached thereto, and also strengthens the tubing during installation. In this way, assembly of the coupling is simplified to better ensure that a leak-free or other secure connection is obtained.

It therefore is a feature of a preferred embodiment of the present invention to provide a coupling for connecting a distal end of a corrugated tube in with a fitting having a forward coupling end. The coupling includes a collet which is receivable coaxially over the distal end of the tube and which has a circumferential wall portion which extends axially from a forward first end to a rearward second end. The second end is configured as having an outer portion and an inner portion of a diameter smaller than the outer periphery of the tube. The inner portion is configured to be receivable within the root portions of the tube for retaining the collet thereon, and presents a generally rearwardly-facing compression surface. The wall portion is longitudinally dissected through the second end thereof into at least a pair of arcuate, cantilevered segments. Each segment is resiliently yieldable for radial outward movement allowing the tube crest portions to be received through the second end of the wall portion as the collet is advanced forwardly over the distal end of the tube into retention within one of the root portions. A fastening member is journaled over the collet first end and is engagable with the coupling end of the fitting to draw the collet and the distal end of the tube toward the fitting. The fastening member has an inner radial surface extending to a rearwardly-facing shoulder portion configured to abuttingly engage the outer portion of the collet second end for urging the collet rearwardly toward the fitting.

It is a further feature of the preferred embodiment of the present invention to provide a coupling assembly for a corrugated tube. The coupling assembly includes a fitting member having a forward coupling end. A collet member is provided to be receivable coaxially over the distal end of the tube and as having a circumferential wall portion which extends axially from a forward first end to a rearward second end. The second end is configured as having an outer portion and an inner portion of a diameter smaller than the outer periphery of the tube. The inner portion is configured to be receivable within the root portions of the tube for retaining the collet member thereon, and presents a generally rearwardly-facing compression surface. The wall portion is longitudinally dissected through the second end thereof into at least a pair of arcuate, cantilevered segments. Each segment is resiliently yieldable for radial outward movement allowing the tube crest portions to be received through the second end of the wall portion as the collet member is advanced forwardly over a distal end of the tube into retention within one of the root portions. A fastening member is journaled over the collet member first end and is engagable with the coupling end of the fitting member to draw the collet member and the distal end of the tube toward the fitting member. The fastening member has an inner radial surface extending to a rearwardly-facing shoulder portion configured to abuttingly engage the outer portion of the collet member second end for urging the collet member rearwardly toward the fitting member.

It is yet a further feature of the preferred embodiment of the present invention to provide a collet for use in a coupling for the connection a distal end of a corrugated tube with a fitting of a variety a forward coupling end. The coupling includes a fastening member having an inner surface which is journalable over the collet and is engagable with the coupling end of the fastening member to draw the collet and the distal end of the tube toward the fitting. The collet is receivable with the fastening member coaxially over the distal end of the tube and is formed as having a circumferential wall portion which extends axially from a forward first end to a rearward second end. The second end is configured as having an outer portion and an inner portion of a diameter smaller than the outer periphery of the tube. The inner portion is configured to be receivable within the root portions of the tube for retaining the collet thereon, and presents a generally rearwardly-facing compression surface and a generally forwardly-facing camming surface. The wall portion is longitudinally dissected through the second end thereof into at least a pair of arcuate, cantilevered segments. Each segment is resiliently yieldable for radial outward movement allowing the tube crest portions to be received through the second end of the wall portion as the collet is advanced with the fastening member forwardly over the distal end of the tube into retention within one of the root portions. When the inner portion of the collet second end is retained within one of the root portions of the tube with fastening member journaled over the collet first end, the outer portion of the collet second end is abuttingly engagable by the fastening member for urging the collet rearwardly toward the fitting compressing at least the first crest portion of the tube distal end between the tapered surface of the fitting and the compression surface of the collet.

It is still further feature of the preferred embodiment of the present invention involves a method of connecting a distal end of a corrugated tube with a fitting of a variety having a forward coupling end. In accordance with the method of the invention, a generally annular collet member is provided as including a circumferential wall portion extending axially along a longitudinal axis from a forward first end to a rearward second end configured as having a radially-outwardly extending outer portion and a radially inwardly-extending inner portion of a diameter smaller than the outer periphery of the tube. The inner portion is configured to be receivable within the root portions of the tube and presents a generally rearwardly-facing compression surface and a generally forwardly-facing camming surface. The wall portion is longitudinally dissected through the second end thereof into at least a pair of arcuate, cantilevered segments. A fastening member is journaled over the first end of the collet member. The fastening member is provided as having an inner radial surface extending from a rearward portion sized radially to accept the outward movement of the collet member segments to a rearwardly-facing shoulder portion configured to abuttingly engage the outer portion of the collet member second end when the inner portion thereof is retained within one of the root portions of the tube for urging the collet member rearwardly toward the fitting. So provided, the collet and fastening members may be advanced coaxially over the distal end of the tube. In this regard, each of the segments the collet member are resiliently yieldable responsive to the bearing of the collet camming surface on the crest portions of the tube for radial outward movement relative to the longitudinal axis allowing the crest portions to be received through the second end of the collet member wall portion. Lastly, with the inner portion of the collet member received within one of the root portions of the tube to retain the collet member on the tube, the coupling end of the fitting may be engaged with the fastening member to draw the collet member and the distal end of the tube toward the fitting.

Advantages of the present invention include a coupling construction for corrugated tubing which simplifies assembly. Additional advantages include a coupling construction which provides for the positive positioning and retention of a one-piece collet on the tubing, and which effects a fluid-tight or other secure connection of the tubing to an associated fitting. These and other advantages will be readily apparent to those skilled in the art based upon the disclosure contained herein.

BRIEF DESCRIPTION OF THE DRAWINGS

For a fuller understanding of the nature and objects of the invention, reference should be had to the following detailed description taken in connection with the accompanying drawings wherein.

The drawings will be described further in connection with the following Detailed Description of the Invention.

DETAILED DESCRIPTION OF THE INVENTION

For the purposes of the discourse to follow, the precepts of the invention herein involved are described in connection with a corrugated tubing coupling and assembly therefor particularly adapted for use in fuel gas line applications in residential or commercial construction such as for coupling an appliance or the like to a fuel gas source. It will be appreciated, however, that aspects of the present invention may find utility in other conduit systems, whether for fluids or for electrical or other applications which utilize corrugated tubing. Use within those systems therefore should be considered to be expressly within the scope of the present invention.

Referring then to the figures wherein corresponding reference characters are used to designate corresponding elements throughout the several views, shown generally at 10 is an assembly according to the present invention for connecting the distal end, 12, of a length of corrugated tubing, represented generally at 14, in fluid communication with a fitting, represented generally at 16. Fitting 16, which is formed of a generally tubular body, 17, with an axial bore, 18, therethrough, is shown to be of a variety having an externally-threaded forward coupling end, 20, which terminates in a generally forwardly-tapered surface, 22. The rearward end, 24, of fitting 16 similarly may be externally-threaded for connection to an auxiliary line of a fuel source, to an appliance or the like (not shown), or to another conduit. Indeed, a pair of fittings 16 may be provided for either end of tubing 14 which may be employed as a transitional fluid conduit between the appliance and the fuel source. Body 17 of fitting 16 additionally may be formed as having a radial flange, 26, with hexagonal flats portion, one of which is referenced at 28, configured for engagement with a wrench or other tool during installation or connection.

Tubing 14, which may be constructed of stainless steel or another metallic material, is conventionally formed of a sinusoidal series of uniform corrugations or convolutions, a first one of which is referenced at 30. As may be best seen through momentary reference to FIG. 4 wherein a partial longitudinal cross-sectional view of tubing 14 is shown in schematic, the convolutions define alternating crest portions which, as is shown at 32, define the outer periphery of tubing 14, and root or trough portions which extend radially inwardly from outer periphery 32. Distal end 12 of tubing 14 is formed by sectioning through, preferably centrally, one of the root portions of the tubing to terminate at about or along a first crest portion, 34, having an associated first root portion, 36.

Returning to FIG. 1, assembly 10 includes, in accordance with the precepts of the present invention, a coupling which, in turn, includes a generally annular collet member, represented generally at 40, and an associated fastening member, represented generally at 80. Fastener 80 may be provided as a hexagonal cap nut which, as is shown at 82, is internally-threaded for a removable engagement with coupling end 20 of fitting 16.

Figure 2:
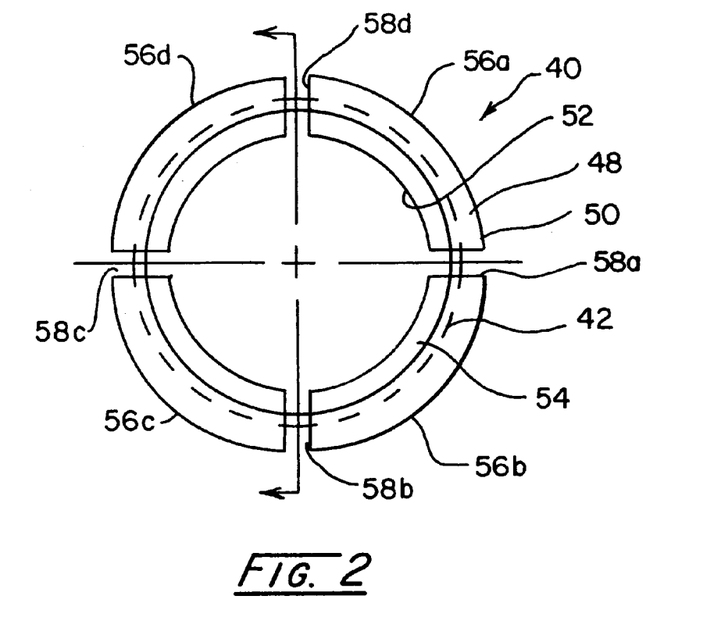
FIG. 2 is a front view showing the collet of FIG. 2 in enhanced detail.
Figure 3:
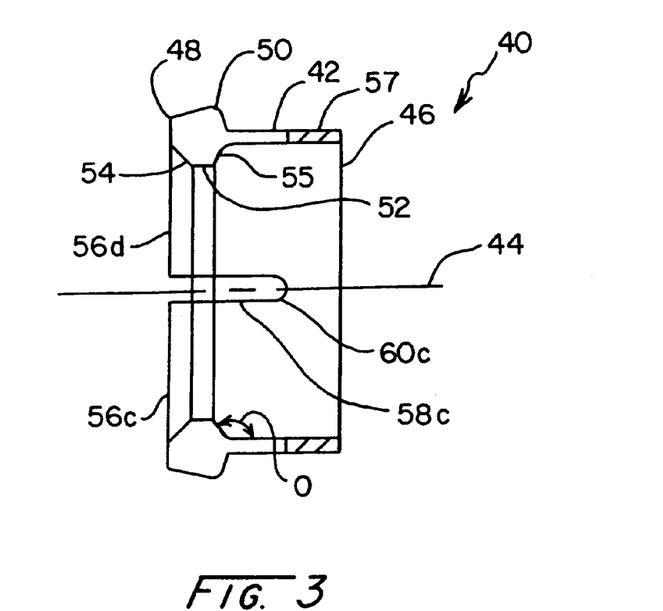
FIG. 3 is a cross-sectional view of the collet of FIG. 2 taken through line 3—3 of FIG. 2.

Collet 40 is formed as having a circumferential wall portion, 42, of a first diameter which is receivable coaxially over distal end 12 of tubing 14. Wall portion 42 extends axially along a longitudinal axis, represented at 44, from a forward first end, 46, to a rearward second end 48. As may be better appreciated through additional reference to FIGS. 2 and 3 wherein collet 40 is shown in enhanced detail, second end 48 is configured as having a radially outwardly-extending outer portion, 50, and a radially inwardly-extending inner portion, 52, of a second diameter which is smaller than the outer periphery 32 (FIG. 4) of tubing 14. Inner portion 52, in turn, is configured to be receivable within a root portion of tubing 14 for retaining collet 40 thereon during assembly, and additionally presents a generally rearwardly-facing, ramped compression surface, 54, and a generally forwardly-facing, ramped camming surface, 55. As is shown, camming surface 55 may be radiused to define an angle, referenced at 2, of about 115E with respect to the inner surface of wall portion 42.

Figure 1:
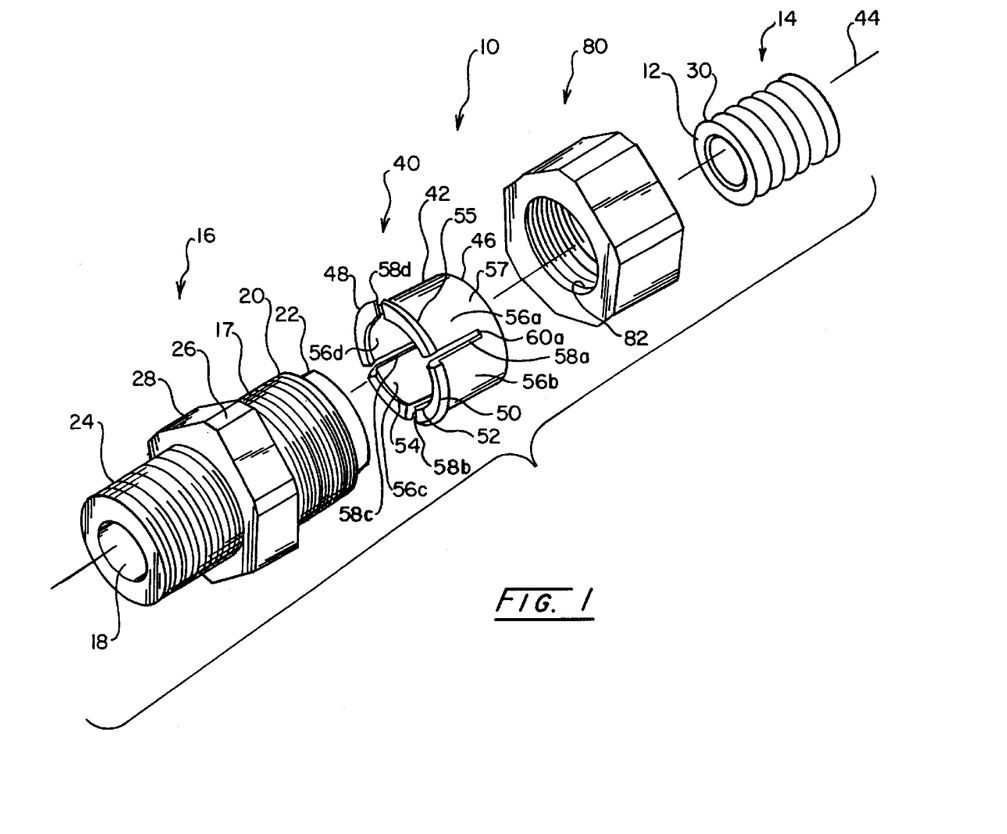
FIG. 1 is an exploded, perspective view of a coupling for corrugated tubing in accordance with the present invention.

Collet wall portion 42 is longitudinally dissected through second end 48 thereof into at least a pair of arcuate, cantilevered segments, four of which are referenced at 56a–d, which extend from a generally circumferentially-continuous tang portion, 57, of collet 40. In the embodiment illustrated, wall portion 42 is longitudinally dissected into segments 56 by a corresponding number of rebates or slots, 58a–d. Each of rebates 58 extends as is shown in FIG. 1 for rebate 58a and in FIG. 3 for rebate 58c through collet second end 48 to terminate at a proximal end, 60a and 60c, respectively, disposed intermediate second end 48 and first end 46 of collet 40. For symmetry, rebates 58 may be equally spaced-apart radially about longitudinal axis 44 to dissect collet 40 into at least a pair of equal segments 56. The preferred number of segments 56 may vary as generally depending upon the nominal diameter of collet 40, but typically will be between from two and eight.

Figure 4:
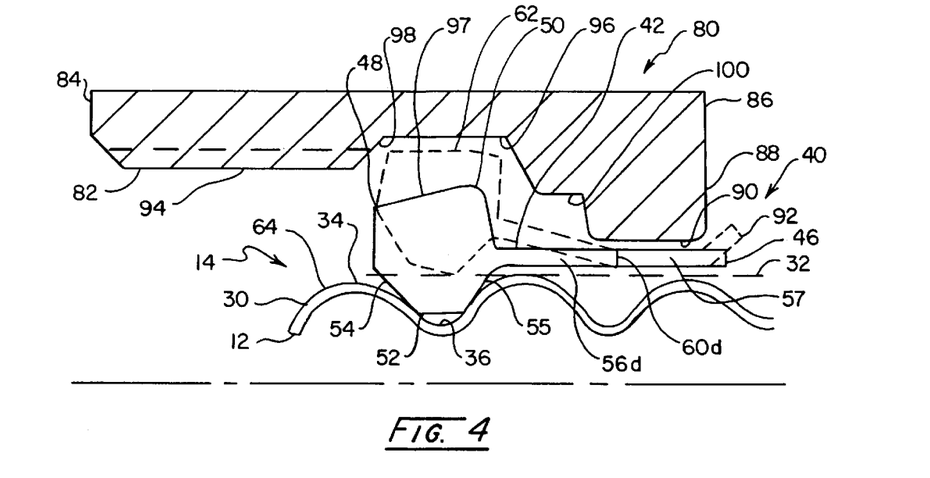
FIG. 4 is a schematic, partial longitudinal cross-sectional view showing the coupling of FIG. 1 as assembled for connection of the distal end of the corrugated tubing to an associated fitting.

Looking next to FIG. 4, as is shown in phantom at 62 for segment 56d, each of segments 56 are provided to be resiliently yieldable or pivotable for radial outward movement relative to longitudinal axis 44. It will be appreciated that this movement, which is responsive to the bearing of collet camming surface 55 along the crest portions of the tubing, allows at least first crest portion 34 of tubing 14 to be received through second end 48 of collet wall portion 42 as collet 40 is advanced forwardly over the distal end 12 of tube 14. The forwardly-inclining orientation of camming surface 55 with respect to, for example, the upwardly sloping surface 64 of tubing crest portion 34 develops a force vector having a normal component which is directed on collet segments 56 radially outwardly from longitudinal axis 44.

By "resiliently yieldable," it is meant that after collet second end 48 is advanced over at least tubing first crest portion 34, each of segments 56 is biased to return to its normal orientation. Collet second end inner portion 52 thereby is receivable within one of the root portions of tubing 14 such as first root portion 36. In this way, collet 40 advantageously may be provided as a one-piece component which is positively positioned and retained on tubing 14 to facilitate assembly.

Fastener 80 is journaled over the second end 48 of collet 40 for a threaded engagement with coupling end 20 of fitting 16 (FIG. 1) drawing collet 40 and tubing distal end 12 toward fitting 16. In general configuration, fastener 80 may be conventionally formed as extending from an open rearward end, 84, to a forward end, 86, which includes a radially inwardly-projecting flange or collar portion, 88, having an opening, referenced at 90, which is sized to receive collet first end 46 and tubing outer periphery 32 concentrically therethrough. Prior to the mounting of collet 40 over tubing distal end 12, it is preferred that fastener 80 and collet 40 are pre-assembled by inserting collet first end 46 through fastener opening 90. In this regard, and as is shown in phantom at 92, collet first end 46 may be flared such that fastener 80 is slidably retained on collet 40 intermediate first and second ends 46 and 48 thereof. Alternatively, collet 40 may be staked into fastener 80, or a slot may be provided on an inner surface of the fastener for receiving a corresponding lip or flange of the collet.

Fastener 80 additionally is formed as having an inner radial surface, 94, a portion of which may define threads 82. From threaded portion 82, radial surface 94 extends to a rearward portion, 96, which is sized radially to accept the outward movement of collet segments 56 as collet 40 is advanced over the distal end 12 of tubing 14. As is shown at 97, it is preferred that collet second end outer portion 50 is generally inclined or angled forwardly to maximize its clearance when pivoted with the inner radial surface 94 of fastener 80. It additionally is preferred that rearward portion 96 of radial surface 94 is configured as a generally circumferentially-continuous annular groove which may have a forwardly-facing shoulder portion, 98. Depending upon the length of collet tang portion 57 and the relative inner diameter of fastener radial surface 94 to the outer diameter of collet 40, the rearward movement of collet 40 relative to tubing 14 may be delimited by shoulder portion 98 and/or collet second end flare 92 as the collet is advanced forwardly over tubing distal end 12 during assembly.

From rearward portion 96, fastener inner radial surface 94 further extends forwardly to a rearwardly-facing shoulder portion, 100. As may be seen with reference to FIG. 5, shoulder portion 100 is configured to abuttingly engage outer portion 50 of collet second end 48 when inner portion 52 thereof is received within one of the root portions, such as first root portion 36, of tubing 14.

Figure 5:
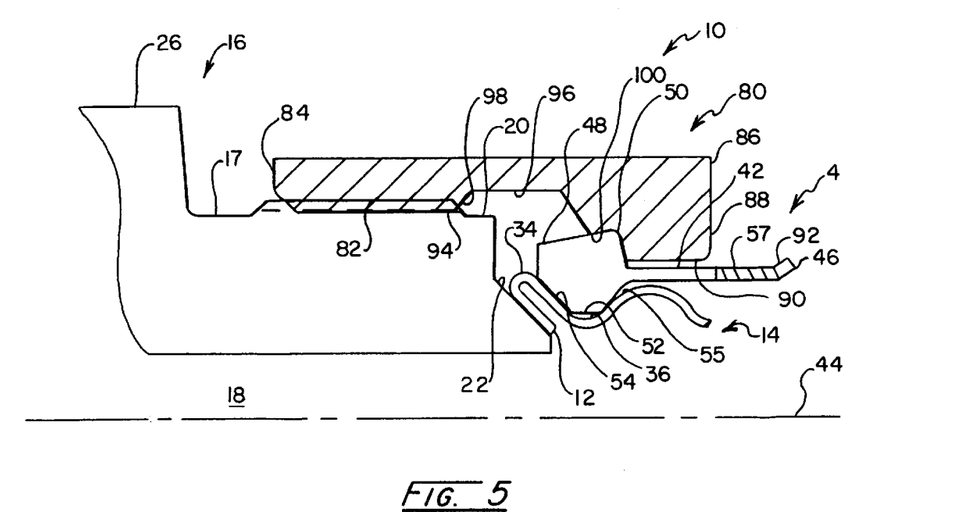
FIG. 5 is a schematic, partial longitudinal cross-sectional view showing the final assembly of the coupling of FIG. 1 as connected to the fitting.

Continuing then with FIG. 5, assembly 10 is illustrated with the internal threads 82 of fastener 80 being engaged with the external threads of coupling end 20 of fitting 16 drawing distal end 12 of tubing 14 into a removable fluid or other connection with fitting throughbore 18. In this regard, as fastener open end 84 is rotated onto fitting coupling end 20, the abutting engagement of collet second end outer portion 50 by fastener shoulder portion 100 urges collet 40 rearwardly toward fitting 16. Concomitantly, and as is shown, at least the first crest portion 34 of tubing 14 is collapsed and compressed between the tapered surface 22 of fitting 16 and the compression surface 54 of collet 40 in a fluid-tight or other sealing engagement. Alternatively, and as is known in the art, crest portion 34 may be collapsed prior to connection using a flaring tool or the like (not shown). To facilitate the effecting of a fluid-tight or other seal, it is preferred that collet compression surface 54 is rearwardly inclined or angled for disposition generally parallel to fitting tapered surface 22. Although it is preferred that only the first crest portion 34 of tubing 14 is compressed between the fitting 16 and collet 40, any number of corrugations 30 left projecting beyond the collet may be so compressed as collapsed prior to or concomitantly with the connection of assembly 10 to fitting 16. To disconnect tubing 14 from fitting 16, the coupling sequence is simply reversed.

Figure 6:
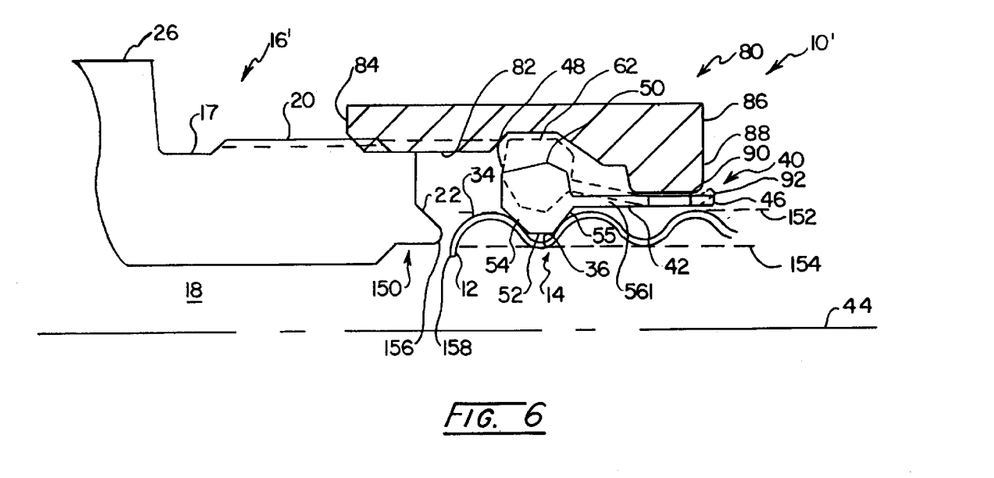
FIG. 6 is a partial cross-section view of an alternative embodiment of a coupling assembly according to the present invention which includes a modified fitting.

Looking next to FIG. 6, an alternative embodiment of coupling assembly 10 of the present invention is shown generally at 10' as including a modified fitting, 16'. In further accordance with the precepts of the present invention, the forward coupling end 20 of fitting 16' is modified to include a counterbore, referenced at 150, which is formed at the forward opening end of axial bore 18. Tapered surface 22 terminates at counterbore 150 to define a generally annular, forwardly-presenting radial land portion, 156, which is sized to confront the first crest portion 34 of tube 14 intermediate the major and minor diametric extents, shown respectively at 152 and 154, of the tube. As may be seen with additional reference to FIG. 7, wherein fastening member 80 and fitting 16' are shown as threadably engaged to draw the distal end 12 of tubing 14 into a removable fluid or other connection with fitting throughbore 18, the tube first crest portion 34 thereby is collapsed and compressed between the land portion 156 of fitting 16' and the compression surface 54 of collet 40 in a flared fluid-tight or other sealing engagement.

Figure 7:
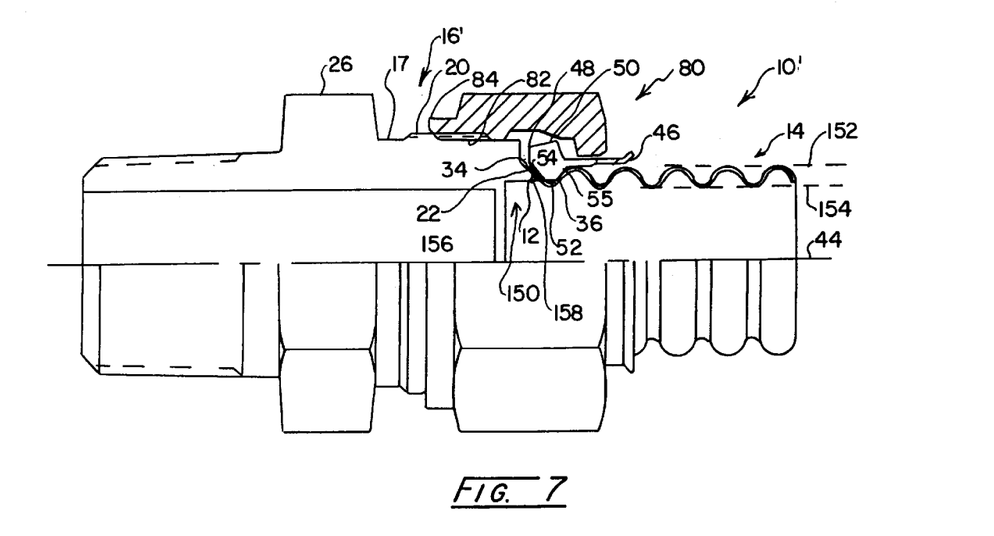
FIG. 7 is a partial longitudinal cross-sectional view showing the coupling of FIG. 6 as connected to the modified fitting of the invention.

It will be appreciated that the addition of land portion 156 advantageously displaces the contact point between the first crest portion 34 of the tubing and the fitting surface 22 radially outward to effect the flaring compression of the tube distal end intermediate the major and minor diametric extents thereof. In this regard, as tube 14 typically is cut to length with a conventional C-clamp type tubing cutter or the like, the incised or cut end of the tube, which may be seen at 158 to extend radially inwardly of the tube minor diameter 154, presents at least the potential for scratching or otherwise damaging surface 22. As such damage could affect the fluid-tight seal between fitting surface 22 and the collapsed crest portion 34 of the tube, a more reliable seal is provided by virtue of the described sealing compression of the tube intermediate its major and minor diameters which avoids the incorporation of its cut end 158 into the joint.

Figure 8:
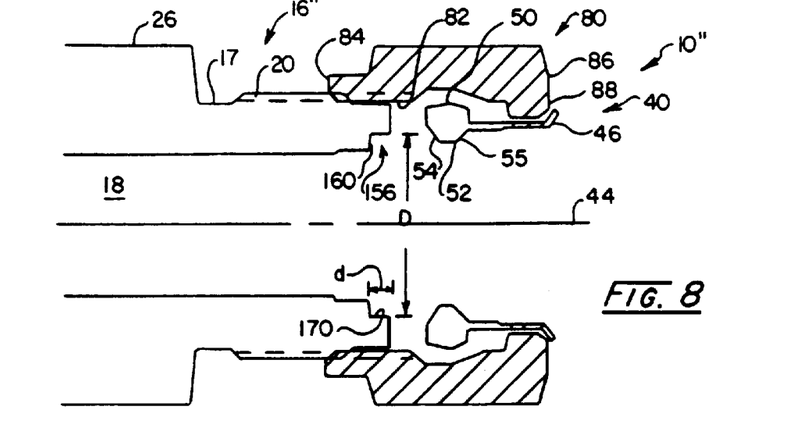
FIG. 8 is a cross-sectional view of another alternative coupling assembly according to the present invention which includes a fitting that is further modified.
Figure 9:
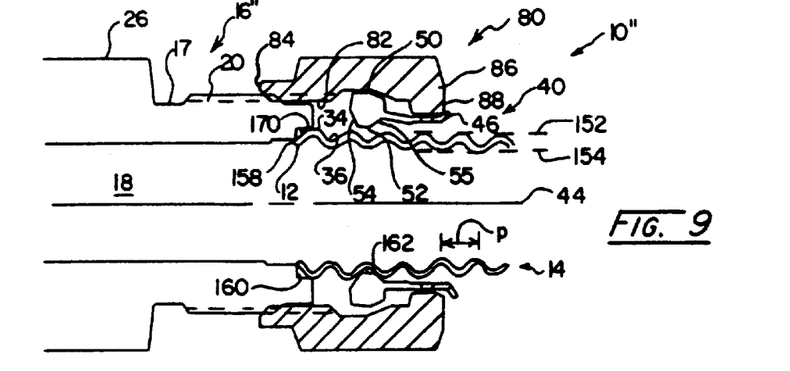
FIG. 9 is a cross-sectional view showing the coupling of FIG. 8 as received over a distal end of a length of corrugated tubing of the connection of the tubing to the modified fitting.

Turning to FIGS. 8 and 9, another alternative embodiment of coupling assembly 10 of the present invention which affords a self-piloting feature is shown generally at 10" as including modified fitting 16". In such embodiment, the forward coupling end 20 of fitting 16" includes counterbore 150, but is configured without tapered surface 22 or land portion 156. Rather, counterbore 150 is configured to receive at least a portion of the first crest portion 34 therein as having a diameter, referenced at "D" in FIG. 8, which is about 0.005–0.025 inch larger than the tube major diameter 152, and as having an axial depth, referenced at "d" in FIG. 8 which is at least one-half of the tube corrugation pitch dimension which is referenced at "p" in FIG. 9. Counterbore 150 further is configured to define as internal, forwardly-presenting surface or step, 160, which extends within the fitting bore 18 radially about axis 44. As is detailed hereafter, internal step 160 provides a both a positive stop and a sealing surface for the tube distal end 12.

As is shown in FIG. 8, although optional, it is preferred for ease of assembly and to assure proper tube depth insertion that fastening member 80 and fitting 16" are pre-engaged by partially threading surface 82 of the fastening member onto the first thread of fitting forward coupling end 20. A conventional thread locking material, such as a Loctite Type 292™, may be used to temporarily affix the fastening member to the fitting. Continuing to FIG. 9, with collet 40 coaxially received within fastener 80 and with the fastener pre-engaged with the fitting in the manner described, tube distal end 12 may be inserted through the forward end 86 of the fastener until a positive stop with internal step 160 is established disposing collet inner portion 52 within, for example, the third root portion, 162, of the tube. It will be appreciated that the pre-assembling of the coupling automatically effects the desired tube depth insertion. Alternatively, visual inspection may be used to confirm the tube has been inserted the proper amount into the fastening member and fitting.

Figure 10:
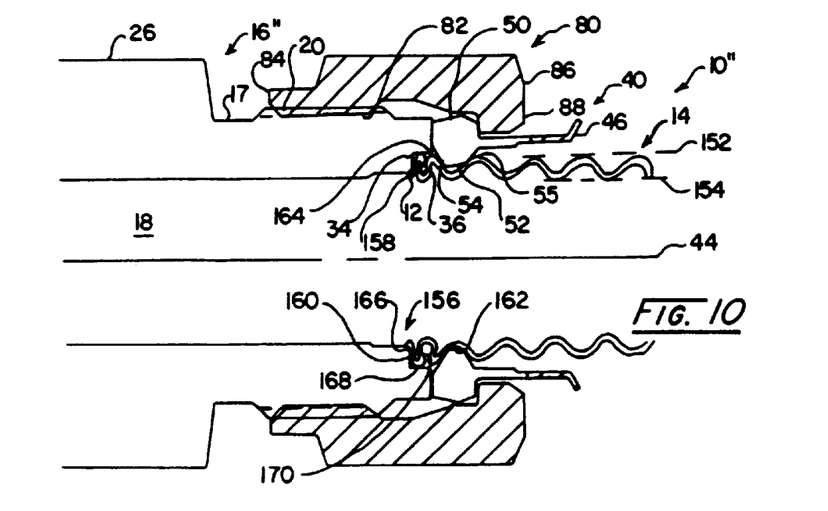
FIG. 10 is a cross-sectional view showing the final assembly of the coupling of FIG. 9 as connecting the tubing distal end to the modified fitting.

Proceeding to FIG. 10, the assembly of coupling 10" continues with the compression of the first corrugation 34 and second corrugation, 164, of the tube to effect a fluid-tight sealing thereof to the internal surface 160 of the fitting. In this regard, with the tube 14 properly positioned within the fastener and fitting, fastener 80 may be rotated into a further threaded engagement with fitting forward end 20 drawing the tube distal end 12 into a removable fluid or other connection with fitting throughbore 18. As the drawing proceeds, the first and second crest portion 34 and 164 of the are collapsed and compressed in an "accordion" fluid-tight or other sealing arrangement between fitting internal step 160 and the compression surface 54 of collet 40. In such an arrangement, multiple or redundant sealing surfaces advantageously are provided, such as the radial seal shown at 166 effected between the contact surfaces of the tube and fitting step 160, and the axial seal shown at 168 effected between the apex of tube first crest portion 134 and the inner radial surface, 170, of counterbore 156.

Thus, a unique coupling construction for corrugated tubing is described herein which facilitates and simplifies assembly, and which may be used to achieve a fluid-tight or other secure connection in a single operation. Such construction additionally is adapted for use with existing fittings as may be associated with an appliance, fuel line, or the like.

Materials of construction for tubing 14, fitting 16, collet 40, and fastener 80 are to be considered conventional for the uses involved. Such materials generally will be corrosion resistant, but particularly will depend upon the fluid or fluids being handled. A metal material such as a mild or stainless steel or brass is preferred for durability, although other types of materials such as plastics may be substituted, however, again as selected for compatibility with the fluid being transferred or for desired mechanical properties.

As it is anticipated that certain changes may be made in the present invention without departing from the precepts herein involved, it is intended that all matter contained in the foregoing description shall be interpreted in as illustrative rather than in a limiting sense. All references cited herein are expressly incorporated by reference.

What is claimed is:

1. A tubing connection for attachment with a fitting of a variety having a forward coupling end, said tubing connection comprising:

a tube having a distal end and being formed of alternating corrugations each having a crest portion defining the outer periphery of the tube and a root portion;

a generally annular collet member received coaxially over the distal end of the tube including a circumferential wall portion extending axially along a longitudinal axis from a forward first end to a rearward second end configured as having a radially-outwardly extending outer portion and a radially inwardly-extending inner portion of a diameter smaller than the outer periphery of the tube, said inner portion received within one of the root portions of the tube and presenting a generally rearwardly-facing compression surface and a generally forwardly-facing camming surface, and said wall portion being longitudinally dissected through the second end thereof into at least a pair of arcuate, cantilevered segments each being resiliently yieldable responsive to the bearing of said collet camming surface on the crest portions of the tube for radial outward movement relative to said longitudinal axis allowing the crest portions to be received through the second end of said wall portion as said collet member is advanced forwardly over the distal end of the tube into retention within said one of the root portions; and a fastening member journaled over said collet member first end and received with said collet member coaxially over the distal end of the tube, said fastening member being engagable with the coupling end of the fitting to draw said collet member towards the fitting, and having an inner radial surface extending from a rearward portion being sized radially to accept the outward movement of said collet member segments as said fastening member and said collet member are received over the distal end of the tube, to a rearwardly-facing engaging portion configured to abuttingly engage the outer portion of said collet member second end for urging said collet member rearwardly towards said fitting.

2. The tubing connection of claim 1 wherein the fitting forward coupling end is formed as having a generally forwardly tapered surface and the distal end of the tube terminates at a first corrugation, and wherein at least the first corrugation of the tube distal end is collapsible between the tapered surface of the fitting and the compression surface of said collet member as said collet member is drawn towards the fitting.

3. The tubing connection of claim 2 wherein said compression surface of said collet member is presented as a rearwardly-inclined ramped surface disposable generally parallel to the tapered surface of the fitting.

4. The tubing connection of claim 1 wherein said collet member wall portion is longitudinally dissected by at least a pair of rebates each extending through said collet member second end to a proximal end disposed intermediate said collet member first and second ends.

5. The tubing connection of claim 4 wherein said rebates are equally spaced-apart radially about said longitudinal axis to divide said collet member into at least a pair of equal segments.

6. The tubing connection of claim 1 wherein said collet member is dissected into at least a pair of equal segments.

7. The tubing connection of claim 1 wherein said fastening member is a cap nut configured for a removable threaded engagement with the coupling end of the fitting.

8. The tubing connection of claim 1 wherein the rearward portion of said fastening member inner radial surface is configured as a generally circumferentially-continuous annular groove.

9. The tubing connection of claim 1 wherein fastening member is slidably retained on said collet member intermediate the first and second ends thereof.

10. A tubing assembly comprising:

a tube having a distal end and being formed of alternating corrugations each having a crest portion defining the outer periphery of the tube and a root portion defining a minor diametric extent of the tube;

a fitting member having a forward coupling end;

a generally annular collet received coaxially over the distal end of the tube including a circumferential wall extending axially along a longitudinal axis from a forward first end to a rearward second end configured as having a radially-outwardly extending outer portion and a radially inwardly-extending inner portion of a diameter smaller than the major periphery of the tube, said inner portion received within one of the root portions of the tube and presenting a generally rearwardly-facing compression surface, and said wall portion being longitudinally dissected through the second end thereof into at least a pair of arcuate, cantilevered segments each being resiliently yieldable responsive to the bearing of said collet camming surface on the crest portions of the tube for radial outward movement relative to said longitudinal axis allowing the crest portions to be received through the second end of said wall portion as said collet is advanced forwardly over the distal end of the tube into retention within said one of the root portions; and a fastening member journaled over said collet first end and received with said collet member coaxially over the distal end of the tube, said fastening member being engaged with the coupling end of said fitting member drawing said collet towards said fitting member, and having an inner radial surface extending from a rearward portion being sized radially to accept the outward movement of said collet segments as said fastening member and said collet member are received over the distal end of the tube, to a rearwardly-facing engaging portion abuttingly engaging the outer portion of said collet member second end for urging said collet rearwardly towards said fitting member.

11. The tubing assembly of claim 10 wherein the distal end of the tube terminates at a first corrugation and said forward coupling end of said fitting member includes a counterbore which is configured to receive at least a portion of the first corrugation therein and which defines an internal radial surface, and wherein at least the first corrugation of the tube distal end is collapsed between the internal radial surface of the fitting member and the compression surface of said collet member as said collet member is drawn towards said fitting member.

12. The tubing assembly of claim 10 wherein said forward coupling end of said fitting member is formed as having a generally forwardly tapered surface and the distal end of the tube terminates at a first corrugation, and wherein at least the first corrugation of the tube distal end is collapsed between the tapered surface of the fitting member and the compression surface of said collet member as said collet member is drawn towards said fitting member.

13. The tubing assembly of claim 12 wherein said compression surface of said collet member is presented as a rearwardly-inclined ramped surface disposed generally parallel to the tapered surface of said fitting member.

14. The tubing assembly of claim 12 wherein said tapered surface of said fitting member forward coupling end terminates to define a radial land portion, and wherein the first corrugation of the tube distal end is collapsed on said land portion intermediate the major and minor diametric extents of the tube.

15. The tubing connection assembly of claim 10 wherein said collet wall portion is longitudinally dissected by at least a pair of rebates each extending through said collet second end to a proximal end disposed intermediate said collet first and second ends.

16. The tubing connection assembly of claim 15 wherein said rebates are equally spaced-apart radially about said longitudinal axis to divide said collet into at least a pair of equal segments.

17. The tubing connection assembly of claim 10 wherein said collet is dissected into at least a pair of equal segments.

18. The tubing connection coupling assembly of claim 10 wherein said fastening member is a cap nut configured for a removable threaded engagement with the coupling end of said fitting member.

19. The tubing connection assembly of claim 10 wherein the rearward portion of said fastening member inner radial surface is configured as a generally circumferentially-continuous annular groove.

20. The tubing connection assembly of claim 10 wherein fastening member is slidably retained on said collet intermediate the first and second ends thereof.

21. A method of connecting a distal end of a corrugated tube with a fitting of a variety having a forward coupling end, the tube being formed of alternating corrugations each having a crest portion defining a major diametric extent of the tube and a root portion defining a minor diametric extent of the tube, said method comprising the steps of:

(a) providing a generally annular collet member receivable coaxially over the distal end of the tube as including a circumferential wall portion extending axially along a longitudinal axis from a forward first end to a rearward second end configured as having a radially-outwardly extending outer portion and a radially inwardly-extending inner portion of a diameter smaller than the outer periphery of the tube, said inner portion configured to be receivable within the root portions of the tube and presenting a generally rearwardly-facing compression surface and a generally forwardly-facing camming surface, and said wall portion being longitudinally dissected through the second end thereof into at least a pair of arcuate, cantilevered segments;

(b) journaling a fastening member over said collet member first end, said fastening member having an inner radial surface extending from a rearward portion being sized radially to accept the outward movement of said collet member segments to a rearwardly-facing engaging portion configured to abuttingly engage the outer portion of said collet member second end when the inner portion thereof is retained within one of the root portions of the tube for urging said collet member rearwardly towards said fitting;

(c) advancing the collet and fastening members coaxially over the distal end of the tube, whereby each of the segments the collet member are resiliently yieldable responsive to the bearing of the collet camming surface on the crest portions of the tube for radial outward movement relative to the longitudinal axis allowing the crest portions to be received through the second end of the collet member wall portion;

(d) receiving the inner portion of the collet member within one of the root portions of the tube to retain the collet member on the tube; and (e) engaging the coupling end of the fitting with the fastening member to draw said collet member towards the fitting.

22. The method of claim 21 wherein the distal end of the tube terminates at a first corrugation, said method further comprising an additional step prior to step (e) of providing the fitting as having a forward coupling end including a counterbore which is configured to receive at least a portion of the first corrugation therein and which defines an internal radial surface, whereby at least the first corrugation of the tube distal end is collapsed in step (e) between the internal radial surface of the fitting and the compression surface of said collet member as said collet member is drawn towards said fitting.

23. The method of claim 21 wherein the distal end of the tube terminates at a first corrugation, said method further comprising an additional step prior to step (e) of providing the forward coupling end of the fitting to terminate in a generally forwardly tapered surface, whereby at least the first corrugation of the tube distal end is collapsed in step (e) between the tapered surface of the fitting and the compression surface of said collet member as said collet member is drawn towards said fitting.

24. The method of claim 23 wherein the tapered surface of said fitting forward coupling end is provided as terminating to define a radial land portion, and wherein the first corrugation of the tube distal end is compressed in step (e) on said land portion intermediate the major and minor diametric extents of the tube.

25. The method of claim 21 wherein the fastening member is journaled over the collet member first end in step (b) as slidably retained on the collet member intermediate the first and second ends thereof.

26. The method of claim 21 further comprising the additional step intermediate steps (b) and (c) of partially engaging the coupling end of the fitting with the fastening member to couple the fitting to the fastening member, and wherein in step (e) the coupling end of the fitting is further engaged with the fastening member drawing said collet member towards the fitting.

27. The method of claim 26 wherein in step (c) the collet and fastening members are advanced coaxially over the distal end of the tube by inserting the distal end of the tube through said fastening member.

28. The tubing connection of claim 1 wherein said fastening member is partially engagable with the coupling end of the fitting to couple the fitting to the fastening member prior to said collet member being received with said fastening member over the distal end of the tube, and wherein said fastening member is further engagable with the coupling end of the fitting after said collet member is received with said fastening member over the distal end of the tube to draw said collet member towards the fitting.

29. The tubing connection of claim 28 wherein said collet and fastening members are received coaxially over the distal end of the tube by inserting the distal end of the tube through said fastening member.

30. The tubing connection of claim 1 wherein said engaging portion of said fastening member radial surface is formed as a shoulder configured to receive the outer portion of the collet member second end.

31. The tubing assembly of claim 10 wherein said fastening member is partially engagable with the coupling end of the fitting member to couple the fitting member to the fastening member prior to said collet being received with said fastening member over the distal end of the tube, and wherein said fastening member is further engagable with the coupling end of the fitting member after said collet is received with said fastening member over the distal end of the tube to draw said collet towards the fitting member.

32. The tubing assembly of claim 31 wherein said collet and said fastening member are received coaxially over the distal end of the tube by inserting the distal end of the tube through said fastening member.

33. The tubing assembly of claim 10 wherein said engaging portion of said fastening member radial surface is formed as a shoulder configured to receive the outer portion of the collet second end.

34. The tubing connection of claim 21 wherein said engaging portion of said fastening member radial surface is formed as a shoulder configured to receive the outer portion of the collet member second end.

35. A coupling assembly for connection with a distal end of a corrugated tube, said coupling assembly comprising:
- a fitting member having a forward coupling end including a sealing surface;
- a compression member receivable coaxially on the distal end of the tube and having a generally rearwardly-facing compression surface; and
- a fastening member journaled over said compression member and receivable with said compression member coaxially over the distal end of the tube, said fastening member having a forward end abuttingly engagable with said compression member and a rearward end partially threadably engaged with the coupling end of said fitting member to couple the fitting member to the fastening member prior to said compression member being received with said fastening member over the distal end of the tube,
- wherein with said fastening member being partially threadably engaged with the fitting member coupling end, said compression and fastening members are receivable coaxially over the distal end of the tube by the insertion of the distal end of the tube through the forward end of said fastening member, and wherein said fastening member thereafter is further engagable with the coupling end of the fitting member to draw said compression member towards the sealing surface of the fitting member, wherein the tube distal end terminates at a first corrugation, and wherein at least said first corrugation is collapsed between the sealing surface of said fitting member and the compression surface of said compression member as said compression member is drawn towards said fitting member.

36. The coupling assembly of claim 35 wherein with said fastening member being partially threadably engaged with the fitting member coupling end, said compression surface of said compression member is positioned a spaced-apart distance from the sealing surface of said fitting member, and wherein the insertion of the tube distal end though said compression member is delimited by the abutting engagement of said end with the sealing surface of said fitting member.

37. A method of connecting a distal end of a corrugated tube with a fitting of a variety having a forward coupling end including a sealing surface, said method comprising the steps of:
(a) providing a compression member receivable coaxially over the distal end of the tube and having a generally rearwardly-facing compression surface;
(b) journaling a fastening member coaxially over said compression member, said fastening member having a forward end abuttingly engagable with said compression member and a rearward end threadably engagable with the coupling end of said fitting;
(c) partially threadably engaging the fastening member rearward end with the coupling end of the fitting to couple the fastening member to the fitting;
(d) inserting the distal end of the tube, which is provided to terminate at a first corrugation through the forward end of said fastening member to coaxially receive said fastening member and said compression member on the distal end of the tube; and
(e) further threadably engaging the coupling end of the fitting wherein at least said first corrugation is collapsed between the sealing surface of said fitting and the compression surface of said compression member as said compression member is drawn towards said fitting with the fastening member to draw said compression member towards the sealing surface of said fitting.

38. The method of claim 37 wherein in step (c) said fastening member is partially threadably engaged with the fitting coupling end such that the compression surface of said compression member is positioned a spaced-apart distance from the sealing surface of said fitting, and wherein in step (d) the insertion of the tube distal end though the fastening member forward surface is delimited by the abutting engagement of said end with the sealing surface of said fitting.

* * * * *